United States Patent

Tamemoto et al.

[11] Patent Number: 5,608,280
[45] Date of Patent: Mar. 4, 1997

[54] COMMUTATOR TYPE ROTARY ELECTRIC MACHINE

[75] Inventors: Hiroaki Tamemoto, Kariya; Yasuhiro Nagao, Okazaki; Masami Niimi, Handa, all of Japan

[73] Assignee: Nippondenso Co., Ltd., Kariya, Japan

[21] Appl. No.: 535,958

[22] Filed: Sep. 28, 1995

Related U.S. Application Data

[63] Continuation of Ser. No. 354,100, Dec. 6, 1994, abandoned.

[30] Foreign Application Priority Data

Dec. 22, 1993 [JP] Japan ................... 5-323869

[51] Int. Cl.⁶ ............... H02K 13/00; H02K 13/04; H02K 5/18
[52] U.S. Cl. ............... 310/239; 310/237; 310/64
[58] Field of Search ............... 310/64, 83, 89, 310/112, 237, 239

[56] References Cited

U.S. PATENT DOCUMENTS

| 1,416,256 | 5/1922 | Borger | 310/237 |
|---|---|---|---|
| 3,521,101 | 7/1970 | Arora | 310/233 |
| 4,631,434 | 12/1986 | Asaoka et al. | 310/112 |
| 4,862,027 | 8/1989 | Isozumi et al. | 310/99 |
| 4,907,464 | 3/1990 | Isozumi | 310/83 |
| 5,343,106 | 8/1994 | Lungu et al. | 310/239 |

FOREIGN PATENT DOCUMENTS

| 358812 | 3/1990 | European Pat. Off. |
| 556416 | 8/1993 | European Pat. Off. |
| 100043 | 3/1922 | Germany. |
| 1948024 | 7/1970 | Germany. |
| 58-28556 | 2/1983 | Japan. |
| 2060273 | 4/1981 | United Kingdom. |

OTHER PUBLICATIONS

Soviet Patents Abstracts, S–X section, week 9237, 1992, Oct. 28, Derwent Publications Ltd. & SA–A–1686 621.

*Primary Examiner*—Clayton E. LaBalle
*Attorney, Agent, or Firm*—Cushman, Darby & Cushman IP Group of Pillsbury Madison & Sutro LLP

[57] ABSTRACT

Disclosed is a commutator type rotary electric machine which is designed to simplify the structure through reduction of number of component parts and allows to significantly enhance heat radiation from a brush. Both end bracket supports a rotary shaft and cylindrical brush holder are made of metal. The cylindrical brush holder is secured to the end bracket. The surface of internal periphery of brush holder is covered by an electrical insulator. Since it is sufficient for the electrical insulator to have a thickness effective to electrically insulate the brush from the cylindrical brush holder, heat generating from brush is effectively conducted to the end bracket and radiated from it. Since the end cylindrical brush holder is made of metals, it is strong, cheap and can be machined easily and both the cylindrical brush holder and the end bracket can be combined and secured easily and, since they can be molded as an integral component, the rigidity can be enhanced, manufacturing processes can be simplified and number of component parts can be reduced.

16 Claims, 4 Drawing Sheets

COMMUTATOR TYPE ROTARY ELECTRIC MACHINE

This is a continuation of application Ser. No. 08/354,100, filed on Dec. 6, 1994, which was now abandoned.

CROSS REFERENCE TO RELATED APPLICATION

This application is based upon and claims priority from Japanese Patent Application 5-323869 filed Dec. 22, 1993, the content of which is incorporated herein by reference.

BACKGROUND OF THE INVENTION

1. Field of the Invention

The present invention relates to a commutator type rotary electric machine and more specifically to its brush holder.

2. Related Arts

Japanese Utility Model Application Laid-Open No. 58-28556 proposes to integrate by resin a brush holder of a surface commutator type electric rotating machine with an end bracket which is a structural member retaining an armature shaft.

However, although the surface commutator type electric rotary machine according to the above publication presents an advantage in the reduction of number of component parts and simplification of structure, there are problems such as the deteriorated strength of end bracket and brush holder and the deformation of bearing retaining section because heat cannot be radiated effectively from brush due to the fact that the brush as a heat generating source is surrounded by a resin mold which has a very poor capacity of heat transfer, and as a result temperature tends to rise excessively around the brush.

SUMMARY OF THE INVENTION

The present invention is made in view of the problems as described above and has a purpose to provide a rotary electric machine in which not only the structure is simplified by reducing number of component parts but also the heat radiating capacity of a brush is significantly improved.

According to the present invention, a commutator type rotary electric machine comprises a yoke, an end bracket supporting a rotary shaft having an armature and a commutator fixed thereon and being press fitted in an open end of the yoke, a brush pressed against surface of the commutator by the force of brush spring in a manner allowing free sliding and a cylindrical brush holder holding the brush toward the commutator in a manner allowing free displacement. The cylindrical brush holder made of a metal is secured on the end bracket and the surface of internal periphery of the cylindrical brush holder is covered by an electrical insulating material.

In a preferred embodiment, the cylindrical brush holder is molded integrally with the end bracket.

In a preferred embodiment, the commutator is composed by a surface type commutator and the cylindrical brush holder retains the brush toward the surface type commutator in a manner which allows free displacement in axial direction.

In a preferred embodiment, the surface type commutator includes an external conductor which is disposed along one end face of the armature core, and has an outer end in radial direction is connected to the armature conductor and an outer end face in axial direction forms a surface contacted by the brush. Further, the commutator includes an internal conductor which is disposed along the end face between the end face of the armature core and the external conductor, connected to the inner end in radial direction of the external conductor at its inner end in radial direction and connected to the armature coil at its outer end in radial direction. The commutator further includes an insulator which electrically insulates the internal conductor from the armature core and the external conductor.

According to the present invention, both the end bracket, which supports the rotary shaft, and the cylindrical brush holder are made of metal, and the brush holder is fixed to the end bracket. Further, the surface of internal periphery is covered by an electrical insulating material.

Since it is sufficient for the electrical insulating material to have a thickness that establishes an effective insulation between the brush and the brush holder, heat of brush (heat generated by an electrical resistance, frictional heat or heat conducted from the commutator) will be effectively conducted to the end bracket from which heat will be radiated.

Moreover, since the cylindrical brush holder and the end bracket are made of metal, they are sturdy, inexpensive and can be easily machined. Both of them can be easily combined and fixed or molded as an integral component so that the rigidity can be enhanced, manufacturing processes can be simplified and number of component parts can be reduced.

Further, since it is not necessary to insulate electrically the brush holder from the end bracket, necessary space can be reduced and the overall size of machine can be made compact.

In the preferred embodiment, the commutator is made of a surface commutator. This allows to simplify the assembly. When assembling the end bracket, for example, it is possible to have the end bracket placed with its side facing top under the condition that a brush is inserted in the brush holder, one end of the rotary shaft on which the armature core and the surface commutator are assembled is inserted partially into the bearing hole of end bracket, the housing is then installed on the other end of rotary shaft and finally it can be finished up by inserting the housing in the end bracket.

DETAILED DESCRIPTION OF THE PRESENTLY PREFERRED EMBODIMENTS

The present invention will be described in detail hereinunder with reference to the accompanying drawings.

First Embodiment

Figure 1:
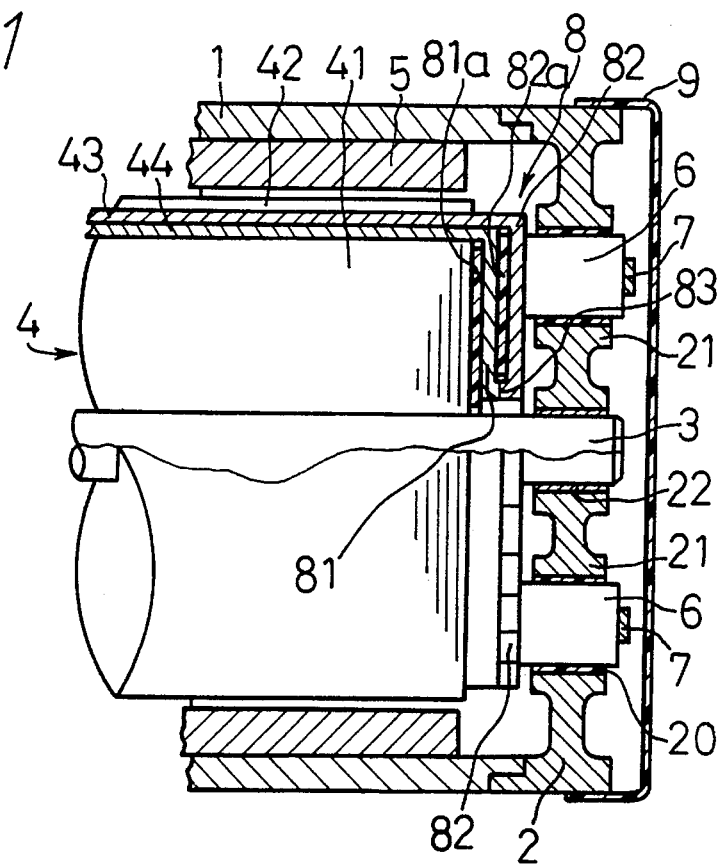
FIG. 1 is a sectional view in axial direction of surface commutator type rotary electric machine according to the embodiment of the present invention.
Figure 2:
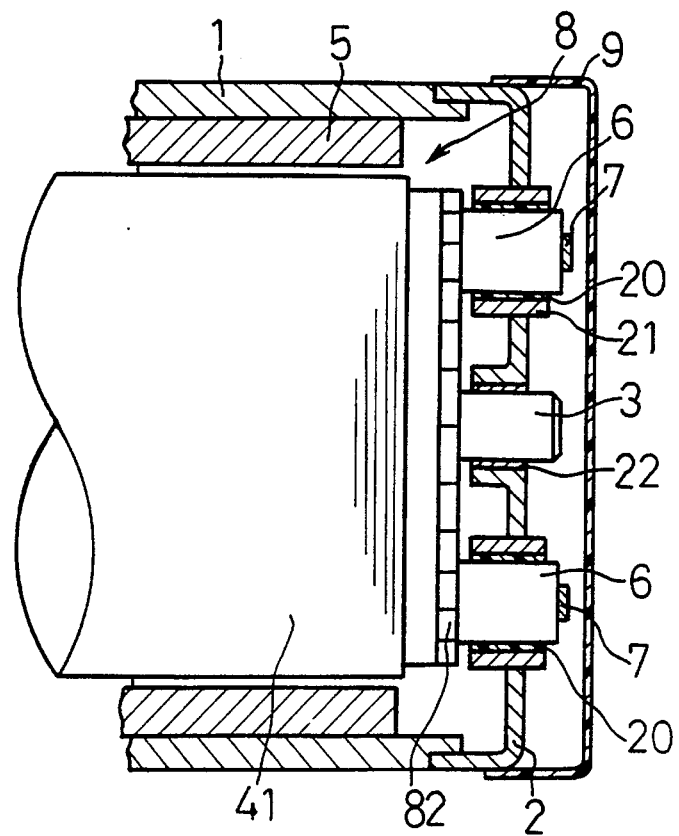
FIG. 2 is a sectional view in axial direction of a modification of the embodiment of FIG. 1.
Figure 3:
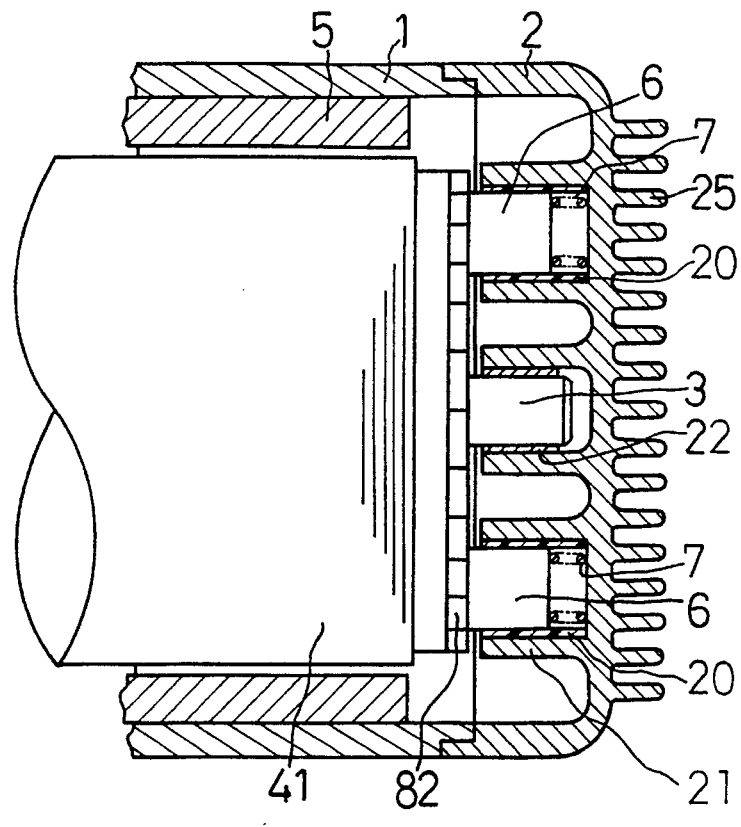
FIG. 3 is a sectional view in axial direction of a modification of the embodiment of FIG. 1.

FIG. 1 through FIG. 3 show an example in which the present invention is applied to a direct current motor as a starter for a vehicle. FIG. 1 is an axial sectional view of this motor.

Outer case of this motor comprises a cylindrical yoke 1 which has a bottom, and an end bracket 2 which is press fitted with and fixed to seal an open rear end of yoke 1. The yoke 1 is made of soft steel and the end bracket 2 is made of metal material of good thermal conductivity like aluminum alloy and the like.

End bracket 2 rotatably supports a rotary shaft 3 for rotation. An armature core 41 which is formed with a stack of laminated steel disk plates is secured near the axial center of the rotary shaft 3. A plural number of slots 42 are provided on the outer peripheral surface of armature core 41 and armature conductors 43 and 44 are inserted in each slot 42 at two levels of top and bottom so as to complete an armature 4. The conductor 43 is called upper conductor and the conductor 44 lower conductor.

On the surface of internal periphery of yoke 1, a plural number of field poles 5 made of permanent magnets are secured in the peripheral direction at an equal interval.

End bracket 2 has the cylindrical brush holder 21 as an integral part thereof and, in the cylindrical brush holder 21, a brush 6 is retained axially movably or in a manner to slide freely in axial direction. On the outer end face of end bracket 2 located around the cylindrical brush holder 21, the base of brush spring 7 made of a plate spring is secured and the free end of the brush spring 7 pushes the brush 6 toward the front left in the figure in axial direction.

Although this embodiment of the present invention refers to a magnet field type direct current motor, it will be apparent that the present invention is not limited to such application but also applicable to coil field type direct current motors as well as other alternating current commutator type motors.

Following description refers to a commutator 8.

To the right or rear end face of armature core 41, an internal conductor 81 is secured by way of a resin type insulator 81a and further, on the surface of conductor 81, an external conductor 82 is secured by way of a resin type insulator 82a. Consequently, the resin type insulator 81a, internal conductor 81, resin type insulator 82a and external conductor 82 composes a surface type commutator 8. In FIG. 1, the sectional view of only one piece each of internal conductor 81 and external conductor 82 are shown but rest of internal and external conductors are disposed radially straightly or spirally when viewed axially.

Armature conductors 43 and 44 are bent by the angle of about 90° or toward radially inwardly inside diameter direction at the rear end face side of armature core 41, the section bent in radial direction of armature conductor 43 becomes the abovementioned external conductor 82 while the section bent radially inwardly from armature conductor 44 becomes the internal conductor 81.

Contact points 83 at both inner ends of each of internal conductor 81 and external conductor 82 are connected by welding and consequently the single wave winding coil of armature coil is completed. Needless to say, it is possible also to employ various other kinds of winding forms like the overlapped winding form.

It should be noted that, in this embodiment of the present invention, the contact points 83 at each inner end of both the external conductor 82 and internal conductor 81 are embossed in a manner to protrude in the axial direction by the thickness of resin type insulator 82a so that each of them become closer to each other. Armature conductors 43 and 44 are insulated each other and from the armature core 41 by an insulating film, sheet or the like and the internal conductor 81 is insulated electrically from rear end face of armature core 41 and the external conductor 82 by resin type insulators 81a and 82a.

In addition, the internal conductor 81 and the external conductor 82 may be made of copper plates by the punching process and the internal conductor 81 may be joined to the end of armature conductor 44 and the external conductor 82 to the end of armature conductor 43 by welding. In such occasion, the external conductor 82 is disposed along the right end face of the armature core 41 to form a commutator bar and its outer end face in the axial direction becomes the face contacted by the brush.

A bearing 22 is press fitted in the bearing hole of end bracket 2 and a cover 9 made of resin which covers the rear end face of end bracket 2.

Since the surface type commutator 8 is secured to the end face of armature core 41, motor length in axial direction can be reduced significantly so that the physical structure and its weight can be reduced. In addition, since a centrifugal force is applied in parallel to contact surface between resin type insulators 81a and 82a and conductors 81 and 82, the withstanding capacity of the commutator against centrifugal force can be enhanced. Area which contacts with the brush 6 also can be enlarged without increasing the physical size. Further, there is a merit that heat caused by electric resistance and frictional heat are favorably cooled down by the centrifugal air flow which generates necessarily and a better heat radiation is achieved through the armature core 41 which has a larger heat radiating capacity, and also through the brush 6 and the end bracket 2.

Next, brush mechanism which is the essential part of this embodiment of the present invention is described in detail.

In FIG. 1, on the end bracket 2 made of a metal which is a better thermal conductor like aluminum alloy or the likes, four brush holders 21 which are open at both ends, are provided 90° apart each other as integral parts of the end bracket 2. Length of cylindrical brush holder 21 in axial direction is nearly equal to the length of end bracket 2 in axial direction.

In each cylindrical brush holder 21, brush 6 is inserted axially movably, the surfaces of internal periphery of a pair of cylindrical brush holders 21 shown in the figure and, around the surface of internal periphery, the inner and outer end faces of end bracket 2 are covered with resin layers 20 (the electrical insulator according to the present invention) which insulate the brushes 6 which are connected to positive (+) terminal (not shown) from the end bracket 2.

On the other hand, the surfaces of internal periphery of remaining pair of cylindrical brush holder 21 (not shown) are not covered by the abovementioned resin layer 20 so that the brushes inserted in these cylindrical brush holders 21 (not shown) are connected to ground (−) terminals (not shown).

Abovementioned resin layer 20 may be provided by painting, surface finish, powder coating finish or the like or, in place of the resin layer 20, ceramic layer which is available by the oxidation process of end bracket 2, insulation film by chemical conversion treatment or cladding finish or resin impregnated insulating sheet, paper or the like may be employed. Of course, the cylindrical brush holder 21 which accommodates the brush 6 at ground side, may be covered with insulation layer 21 or any other electrical insulating material so as to insulate brush 6 from the end bracket 2.

Rear end face of brush 6, as mentioned above, is pushed forward to the left by the force of brush spring 7 so that the brush 6 is forced against the brush contacting surface of surface type commutator 8.

In this embodiment of the present invention, the brush spring 7 is made of elastic metal with better electric conductivity so that the brush spring acts also as the terminal to supply electricity to the brush 6. Therefore, the base (not shown) of brush spring 7 supplying electricity to the brush 6 at positive side is secured through an electrically insulating resin spacer (not shown) so as to be electrically insulated from end bracket 2.

Of course, the brush 6 may be accommodated in a metal tube having a bottom, the metal tube may be axially movably inserted in the cylindrical brush holder 21 and a lead wire may be connected to the bottom of the metal tube, for example. In such occasion, it is preferable to push the metal tube with the brush spring 7.

Although the foregoing description referred to a commutator type rotary electric machine which has a surface type commutator secured on the end face of armature core 41, the end bracket 2 having cylindrical brush holder 21 as integral parts according to this embodiment may be applicable also to a commutator type rotary electric machine with a surface type commutator of other type or with a tubular commutator.

According to this embodiment of the present invention, since the rotary shaft 3 is rotatably supported by the end bracket 2 which is made of a metal having a good thermal conductance and the cylindrical brush holder 21 is integrated with the end bracket 2, heat by resistance and frictional heat generating at the brush 6 is effectively conducted to the end bracket 2 and radiated to the yoke 1 which is engaged with the end bracket 2 and has a larger thermal capacity so that abrupt temperature rises of the armature 4, brush 6 and surface type commutator 8 are prevented and the performance degradation of rotary electric machine by a possible increase in the electrical resistance is reduced. It should be noted that the influence of heat radiation of resin layer 21 which insulates electrically the brush 6 from the cylindrical brush holder 21 is negligibly small because it is in thin layer form and its thermal transfer resistance is small. The integral design as mentioned above enables to shorten an axial length of the electric rotary machine and the physical size may be made compact.

Moreover, in this embodiment of the present invention, as the armature conductors 43 and 44 also act as the internal and the external conductors 81 and 82 of the commutator 8 respectively, the commutator 8 itself also act as a coil end and thus physical sizes of commutator 8 and armature 4 can be reduced. Heat generating from the brush 6, internal and external conductors 81 and 82 is not easily conducted to the armature core 41 by the presence of resin type insulators 81a and 82a which are far more thicker than the resin layer 20. Further, because heat generating from the surface type commutator 8 is also conducted effectively to the end bracket 2 via the brush 6, temperature rises at the brush 6 and the surface type commutator 8 can be restricted and a possible degradation of rectifying capacity by temperature rise can be prevented.

Since the amount of material used for the layer 20 or substituting electrical insulator of cylindrical brush holder 21 is very small because the layer or the substituting material is in a thin film form. Even if some expensive insulator with higher thermal resistance is employed, the extent of cost increase will be negligible owing to a very limited amount of use.

Description of Modified Embodiments

Some of modified embodiments according to the present invention are described next. It should be understood that the same reference numerals will be given to the parts of identical or similar functions for a better comprehension.

In FIG. 2, cylindrical brush holder 21 which is in a sleeve form and is made separately from the end bracket 2 is inserted in the hole of end bracket 2 and secured by welding or caulking. On the other hand, resin layer 20 which provides an electrical insulation is coated over the surface of internal periphery (also on external periphery if necessary) of cylindrical brush holder 21.

In FIG. 3, by shaping the end bracket 2 like a dish and providing a bottom to the cylindrical brush holder 21, the resin cover 9 in first embodiment of the present invention is eliminated. In this modification, a coil spring which is accommodated in the cylindrical brush holder 21 makes the brush spring 7. Here, in this embodiment, the surface of internal periphery of cylindrical brush holder 21 for the brush 6 at positive side is covered by the resin layer 20.

In addition, the power supply to the brush 6 in this embodiment is made through a lead wire (not shown) of which the end of the wire is connected to an electrode plate (not shown) secured to the rear end face of brush 6. Other end of the lead wire is connected to a terminal which is electrically insulated from and secured to the end bracket 2. A cooling fin 25 which radiates heat from the end bracket 2 is provided.

Figure 4:
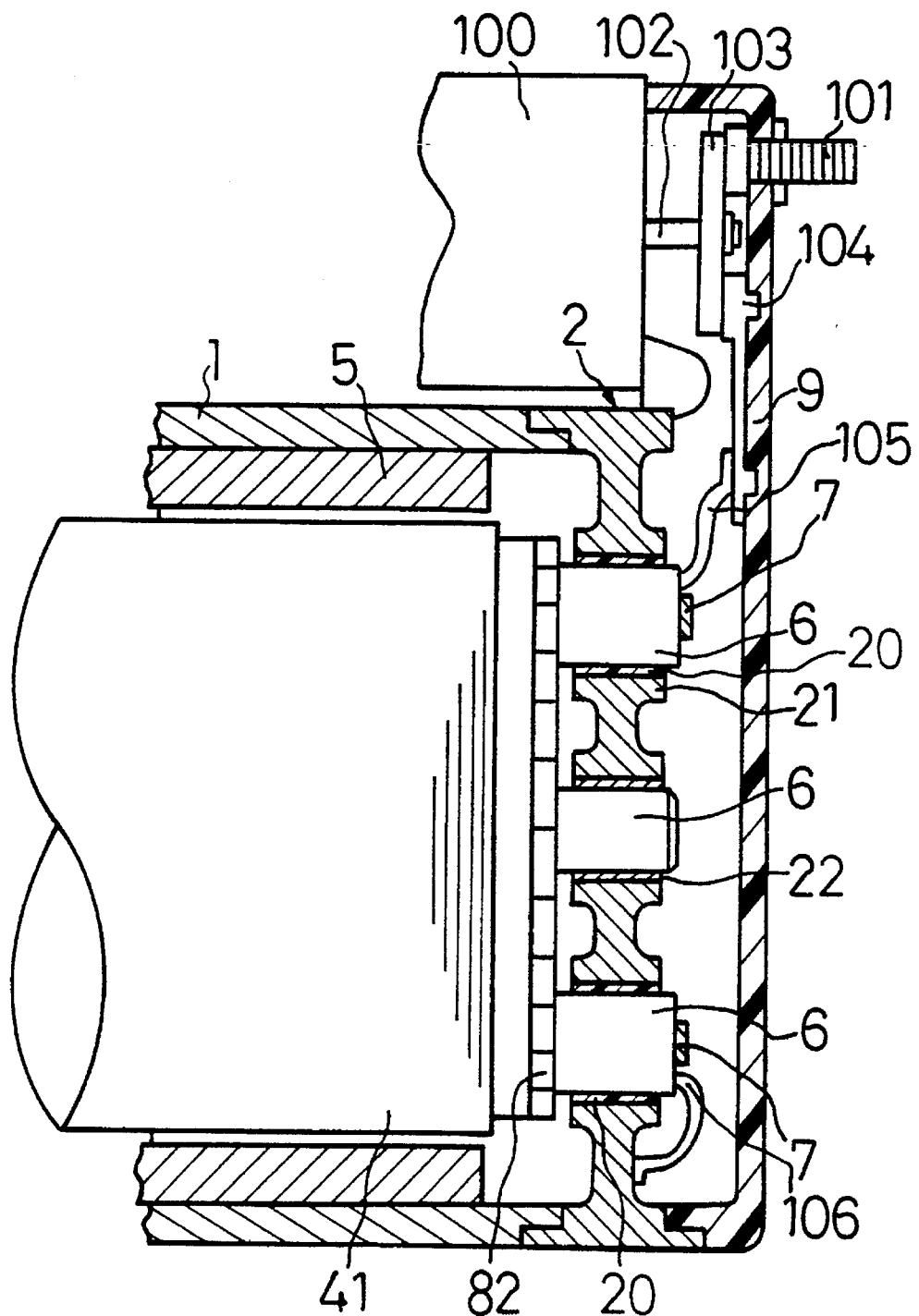
FIG. 4 is a sectional view in axial direction of a modification of the embodiment of FIG. 1.

In FIG. 4, cover 9 which covers the rear end face of end bracket 2 is made of resin and the cover 9 assists to secure a magnet switch 100 to the housing 1 at a position atop the end bracket 2 in FIG. 4. A bolt-like power supply terminal 101 is secured to the inner end face of cover 9 and the power supply terminal 10 is in a state that it can be connected electrically to a fixed contactor 104 by a movable contactor 103 secured on a plunger shaft 102 of magnet switch 100. The fixed contactor 104 is secured to the inner end face of cover 9 by the insert molding, for example, and connected to the brush 6 by a lead wire 105. A grounding lead wire 106 establishes a grounding connection of brush 6 at ground pole side to the end bracket 2.

The cover 9 may be made of metal provided that the electrical insulation is established at necessary sections.

It is clear, in respective embodiments as described above, the resin layer 20 may be substituted with a tubular electrical insulator.

Figure 5:
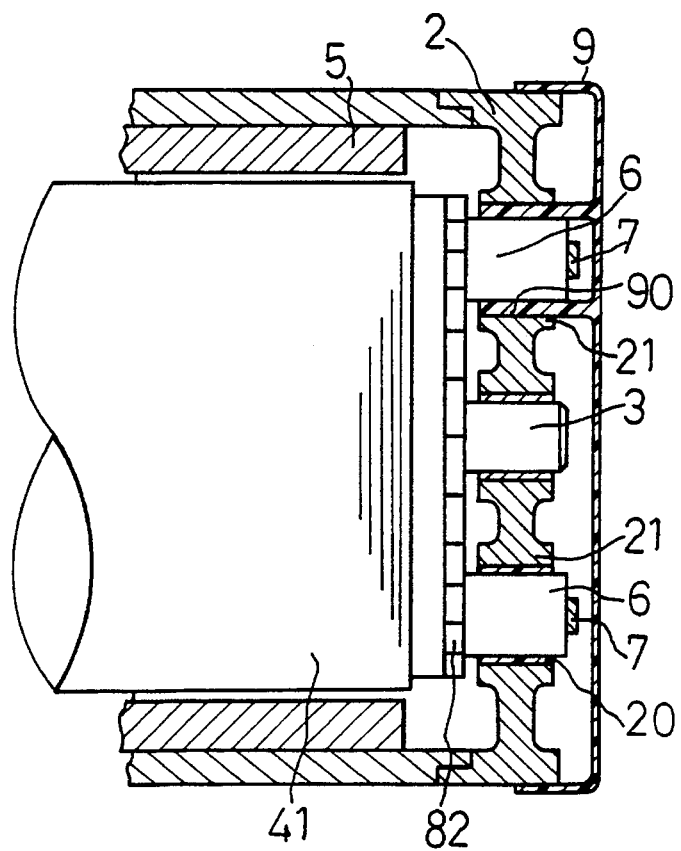
FIG. 5 is a sectional view in axial direction of a modification of the embodiment of FIG. 1.

In FIG. 5, the resin tube 90 which protrudes forward is molded integrally to the resin cover 9, the resin tube 90 is inserted into cylindrical brush holder 21 of end bracket 2 and in turn the brush 6 is inserted in the resin tube 90.

In this embodiment, since the base end part (not shown) of brush spring 7 which is made of plate spring and supplies power to the brush, is secured, as in the first embodiment, to the surface of external periphery of end bracket 2 while electrically insulated from the end bracket 2, a cut-out slot (not shown) which allows a free oscillation in axial direction for the brush spring 7 is provided at a part of peripheral wall of resin tube 90. Of course, another cut-out slot (not shown) through which lead wire to supply power to the brush may be provided on another part of peripheral wall of resin tube 90.

Figure 6:
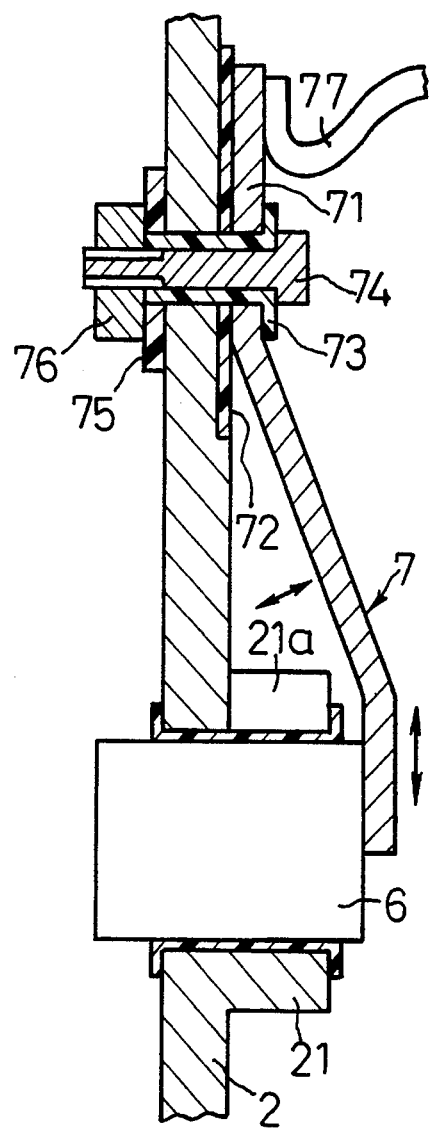
FIG. 6 is an enlarged sectional view of one example of a brush structure.

Referring to FIG. 6, an example of brush spring made of plate spring is described.

Base end 71 of brush spring 7 contacts with the outer end face of end bracket 2 via a resin sheet 72. A flanged resin sleeve 73 is press fitted through end bracket 2, brush spring 7 and a hole of resin sheet 72 and further a bolt 74 is inserted in the flanged sleeve 73. A nut 76 is installed on a bolt 74 via a resin washer 75. Lead wire 77 is soldered to the base end of brush spring 7. A cut-out slot 21*a* in which the brush spring 7 displaces is formed and its surface is covered with resin coating.

Figure 7:
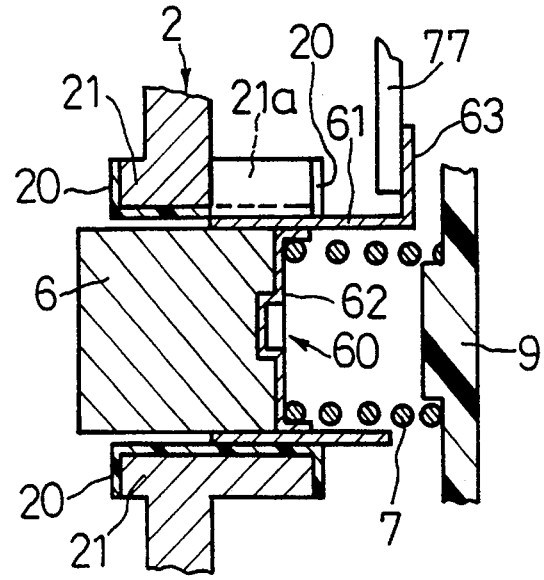
FIG. 7 is an enlarged sectional view of another example of a brush structure.

Referring to FIG. 7, an example of brush spring 7 made of coil spring is described.

Base end of brush 6 is inserted in a copper sleeve 60. On the surface of internal periphery of copper sleeve 60 and at the center in the axial direction, an intermediate floor 62 which contacts with the end face of brush 6 is provided and besides a terminal plate 63 is disposed on the surface of external periphery of right end section of copper sleeve 60 in a manner protruding in radial direction and a lead wire 77 is secured to a terminal plate 63.

On the other hand, the base end 71 of brush spring 7 is locked on the inner end face of resin cover 9 and the other end is pushing forward the intermediate floor 62 of the copper sleeve 60.

What is claimed is:

1. A commutator type rotary electric machine comprising:

a yoke made of a metal;

an end bracket made of a metal to support a rotary shaft on which an armature core made of a metal and a commutator are fixed and fixed in an open end of said yoke;

a brush axially slidably pressed against a surface of said commutator by the force of a brush spring;

a generally cylindrical brush holder movably holding said brush toward said commutator, said cylindrical brush holder being made of a metal and being fixed on said end bracket made of a metal; and an electrical insulating material covering a surface of an internal periphery of said cylindrical brush holder;

wherein said commutator is a surface type commutator that comprises:

a plurality of external conductors disposed along one axial end face of said armature core to compose a plurality of commutator bars, each having a radial outer end electrically connected to an outer armature conductor and having an axial outer end surface which forms the surface contacted by said brush;

a plurality of internal conductors disposed along said axial end face and between said axial end face of said armature core and said external conductors, each having a radial inner end electrically connected to a respective radial inner end of a said external conductor and having a radial outer end connected to an inner armature conductor; and said external conductors and said internal conductors being electrically insulated from each other, said internal conductors and said armature core being electrically insulated from each other;

said end bracket, said brush holder, and said yoke being in heat transfer relation from said brush, and said external conductors, said internal conductors and said core being in another heat transfer relation from said brush;

said commutator being constructed and arranged to generate a centrifugal air flow.

2. A commutator type rotary electric machine as claimed in claim 1, wherein said cylindrical brush holder is molded integrally with said end bracket and extends axially from said end bracket inwardly and outwardly.

3. A rotary electric machine comprising:

an end bracket made of a heat conductive material;

armature means rotatably supported by said end bracket and including electric conductors forming a part of an armature coil and extending radially toward an axis of said armature means, said radially extending electric conductors being constructed and arranged to generate a centrifugal air flow;

brush means for supplying electric current to said electric conductors when contacted with said electric conductors;

holder means made of heat conductive metal and fixed to said end bracket for movably receiving said brush means therein, said holder means being formed at a plurality of locations spaced apart from each other;

insulator means interposed between said brush means and said holder means for electrically insulating said brush means from said end bracket, while keeping heat conduction relation between said brush means and said holder means; and cover means made of electrical insulator material and covering said holder means and said end bracket therein.

4. A rotary electric machine as set forth in claim 3, wherein said end bracket and said holder means are formed integrally and wherein said end bracket has a hole through which said brush means extends.

5. A rotary electric machine as set forth in claim 3, wherein said holder means extends inwardly from said end bracket, and wherein said end bracket has cooling fins extending outwardly from said end bracket.

6. A rotary electric machine as set forth in claim 3, further comprising:

magnet switch means mounted outside said end bracket and having a movable conductor;

terminal means fixed on said cover means for receiving electric power;

fixed contactor means fixed on said cover means and connector to said terminal means through said movable contactor of said magnet switch means; and lead wire means connecting said fixed contactor means to said brush means.

7. A rotary electric machine comprising:

end bracket made of a heat conductive material;

armature means rotatably supported by said end bracket and including electric conductors forming a part of armature coil;

brush means for supplying electric current to said electric conductors when contacted with said electric conductors;

holder means made of heat conductive metal and fixed to said end bracket for movably receiving said brush means therein;

insulator means interposed between said brush means and said holder means for electrically insulating said brush means from said end bracket, while keeping heat conduction relation between said brush means and said holder means; and cover means made of an electric insulator material and covering said holder means, said cover means being formed integrally with said insulator means.

8. A rotary electric machine as set forth in claim 7, wherein said electric conductors extend axially and radially on an outer periphery and on an axial side end of said core, respectively, and wherein said brush means extends axially to contact with said conductors on said axial side end.

9. A commutator type rotary electric machine comprising:

a housing;

an armature core made of metal and disposed rotatably in said housing;

a commutator disposed on an axial side end of said armature core, said commutator including an internal conductor and an external conductor both extending radially along said axial side end, a first insulator disposed between said armature core and said internal conductor, and a second insulator disposed between said internal conductor and said external conductor, said commutator being constructed and arranged to generate a centrifugal air flow;

an end bracket made of a metal and coupled with said housing to close an axial open end of said housing; and a brush slidably supported in said end bracket and contacting axially said external conductor of said commutator, said brush being held in a first heat conduction relation with said armature core through said commutator and in a second heat conduction relation with said end bracket.

10. A rotary electric machine as claimed in claim 9, further comprising:

a brush holder made of a metal and connected with said end bracket substantially at an axial center thereof, said brush holder extending axially inwardly and outwardly to support said brush therein slidably, and wherein said end bracket is disposed close to and in parallel to the commutator.

11. A rotary electric machine as claimed in claim 9, wherein said brush is supported in said end bracket at a plurality of locations which are equi-angularly spaced from each other and axially adjacent to an outer periphery portion of said commutator, and wherein said housing is made of a metal and in heat conductive relation with said end bracket.

12. A commutator type rotary electric machine comprising:

a housing;

an armature core having a shaft and disposed in said housing;

a commutator disposed on an axial side end of said armature core, the commutator being constructed and arrange to generate a centrifugal air flow;

a brush axially contacting said commutator;

an end bracket made of a heat conductive material, disposed close to and in parallel with said commutator, coupled with said housing to close an axial open end of said housing, and supporting said shaft;

a brush holder made of a heat conductive material and supported in said end bracket, said brush holder supporting said brush axially slidably therein; and a cover disposed away from said commutator and covering therein said brush, said end bracket and said brush holder.

13. A rotary electric machine as claimed in claim 12, wherein said brush holder extends axially and is supported by said end bracket at substantially the axial center thereof, said brush holder exposes substantially only an axial end portion of the brush.

14. A rotary electric machine as claimed in claim 13, wherein:

said armature core, said commutator and said brush are in a heat conductive relation;

wherein said brush holder is formed in said end bracket at a plurality of locations which are equi-angularly spaced from each other and axially adjacent to an outer periphery portion of said commutator; and wherein said housing is made of a metal and in heat conductive relation with said end bracket.

15. A commutator type rotary electric machine comprising:

a housing;

an armature core made of metal and disposed rotatably in said housing;

a commutator disposed on an axial side end of said armature core, said commutator including an internal conductor and an external conductor both extending radially along said axial side end, said armature core and said internal conductor being electrically insulated from each other, and said internal conductor and said external conductor being electrically insulated from each other, said commutator being constructed and arranged to generate a centrifugal air flow;

an end bracket made of a metal and coupled with said housing to close an axial open end of said housing; and a brush slidably supported in said end bracket and contacting axially said external conductor of said commutator, said brush being held in a first heat conduction relation with said armature core through said commutator and in a second heat conduction relation with said end bracket.

16. A commutator type rotary electric machine as claimed in claim 15, wherein the end bracket is disposed in parallel to and close to the commutator and exposes substantially only an axial end portion of the brush.

* * * * *